(12) United States Patent
McLain et al.

(10) Patent No.: US 8,234,038 B2
(45) Date of Patent: Jul. 31, 2012

(54) INTAKE AIR TEMPERATURE DIAGNOSTIC SYSTEM

(75) Inventors: Kurt D. McLain, Clarkston, MI (US); Wenbo Wang, Novi, MI (US)

(73) Assignee: GM Global Technology Operations LLC

( * ) Notice: Subject to any disclaimer, the term of this patent is extended or adjusted under 35 U.S.C. 154(b) by 1281 days.

(21) Appl. No.: 11/945,608

(22) Filed: Nov. 27, 2007

(65) Prior Publication Data

US 2009/0138154 A1    May 28, 2009

(51) Int. Cl.
*G01M 17/00* (2006.01)
*B63B 35/73* (2006.01)
*F02M 23/08* (2006.01)

(52) U.S. Cl. ......... 701/34; 440/88 A; 123/327; 123/704; 123/179.18

(58) Field of Classification Search ........................ None
See application file for complete search history.

(56) References Cited

U.S. PATENT DOCUMENTS

| | | | |
|---|---|---|---|
| 5,522,367 A * | 6/1996 | Reuschenbach et al. | 123/492 |
| 6,035,831 A * | 3/2000 | Stuber et al. | 123/492 |
| 6,276,316 B1 * | 8/2001 | Arai et al. | 123/90.11 |
| 6,644,104 B2 * | 11/2003 | Muto et al. | 73/114.34 |
| 7,178,388 B2 * | 2/2007 | Okuda et al. | 73/114.34 |
| 7,267,086 B2 * | 9/2007 | Allen et al. | 123/41.44 |
| 7,284,424 B2 * | 10/2007 | Kanke et al. | 73/204.15 |
| 7,369,937 B1 * | 5/2008 | Wang et al. | 701/114 |
| 7,693,647 B2 * | 4/2010 | Suzuki | 701/113 |
| 7,874,143 B2 * | 1/2011 | Wanibe | 60/285 |
| 2002/0011066 A1 * | 1/2002 | Takakura et al. | 60/277 |
| 2004/0047391 A1 * | 3/2004 | Berndorfer et al. | 374/45 |
| 2007/0251481 A1 * | 11/2007 | Izumi et al. | 123/179.16 |
| 2008/0196487 A1 * | 8/2008 | Suzuki | 73/114.34 |
| 2008/0243362 A1 * | 10/2008 | Mitsuda et al. | 701/103 |
| 2009/0306879 A1 * | 12/2009 | Takubo | 701/104 |
| 2010/0082188 A1 * | 4/2010 | Ando | 701/22 |

FOREIGN PATENT DOCUMENTS

WO    WO2007/063396    6/2007

OTHER PUBLICATIONS

U.S. Appl. No. 11/464,340, filed Aug. 14, 2006, Wenbo Wang et al.
U.S. Appl. No. 11/821,590, filed Jun. 22, 2007, Wenbo Wang et al.
U.S. Appl. No. 11/821,591, filed Jun. 22, 2007, Kurt D. Mc Lain et al.

* cited by examiner

*Primary Examiner* — Thomas Tarcza
*Assistant Examiner* — Nagi Murshed

(57) ABSTRACT

A method of evaluating intake air temperature (IAT) sensor rationality may include measuring a first intake air temperature associated with an engine using an IAT sensor when the engine is in a non-operating condition, determining a second intake air temperature associated with the engine using a hot wire air flow meter when the engine is in the non-operating condition, and indicating an IAT sensor fault when a difference between the first and second intake air temperatures exceeds a predetermined temperature limit.

14 Claims, 3 Drawing Sheets

INTAKE AIR TEMPERATURE DIAGNOSTIC SYSTEM

FIELD

The present disclosure relates to engine diagnostic systems, and more specifically to intake air temperature sensor diagnostic systems.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature (IAT), manifold absolute pressure (MAP), throttle position (TPS), engine RPM and barometric pressure ($P_{BARO}$). With specific reference to the throttle, the state parameters (e.g., air temperature and pressure) before the throttle may be used for engine control and diagnostic systems. Traditional internal combustion engines include an IAT sensor that directly measures the IAT. In some instances, however, the IAT sensor can become inaccurate as a result of damage, wear and/or a number of other factors. Accordingly, the IAT sensor should be monitored to determine whether the IAT that is determined based on the IAT sensor reading is accurate.

Traditional internal combustion engine systems may additionally include a second IAT sensor, the reading from which is compared to that of the first IAT sensor in order to determine whether the first IAT sensor is accurate. This additional IAT sensor increases cost and complexity and itself must be monitored for accuracy.

SUMMARY

A method of evaluating intake air temperature (IAT) sensor rationality may include measuring a first intake air temperature associated with an engine using an IAT sensor when the engine is in a non-operating condition, determining a second intake air temperature associated with the engine using a hot wire air flow meter when the engine is in the non-operating condition, and indicating an IAT sensor fault when a difference between the first and second intake air temperatures exceeds a predetermined temperature limit.

The method may further include determining a mass air flow (MAF) rate into an engine during operation thereof using the hot wire air flow meter.

A control module may include an intake air temperature (IAT) sensor temperature determination module, a mass air flow (MAF) sensor temperature determination module, an intake temperature evaluation module, and an IAT sensor fault determination module. The IAT sensor temperature determination module may determine a first intake air temperature measurement associated with an engine using an IAT sensor when the engine is in a non-operating condition. The MAF sensor temperature determination module may determine a second intake air temperature associated with the engine using a hot wire air flow sensor when the engine is in a non-operating condition. The intake temperature evaluation module may be in communication with the IAT sensor temperature determination module and the MAF sensor temperature determination module and may determine a difference between the first and second intake air temperatures. The IAT sensor fault determination module may be in communication with the intake temperature evaluation module and may indicate an IAT sensor fault when the difference exceeds a predetermined temperature limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
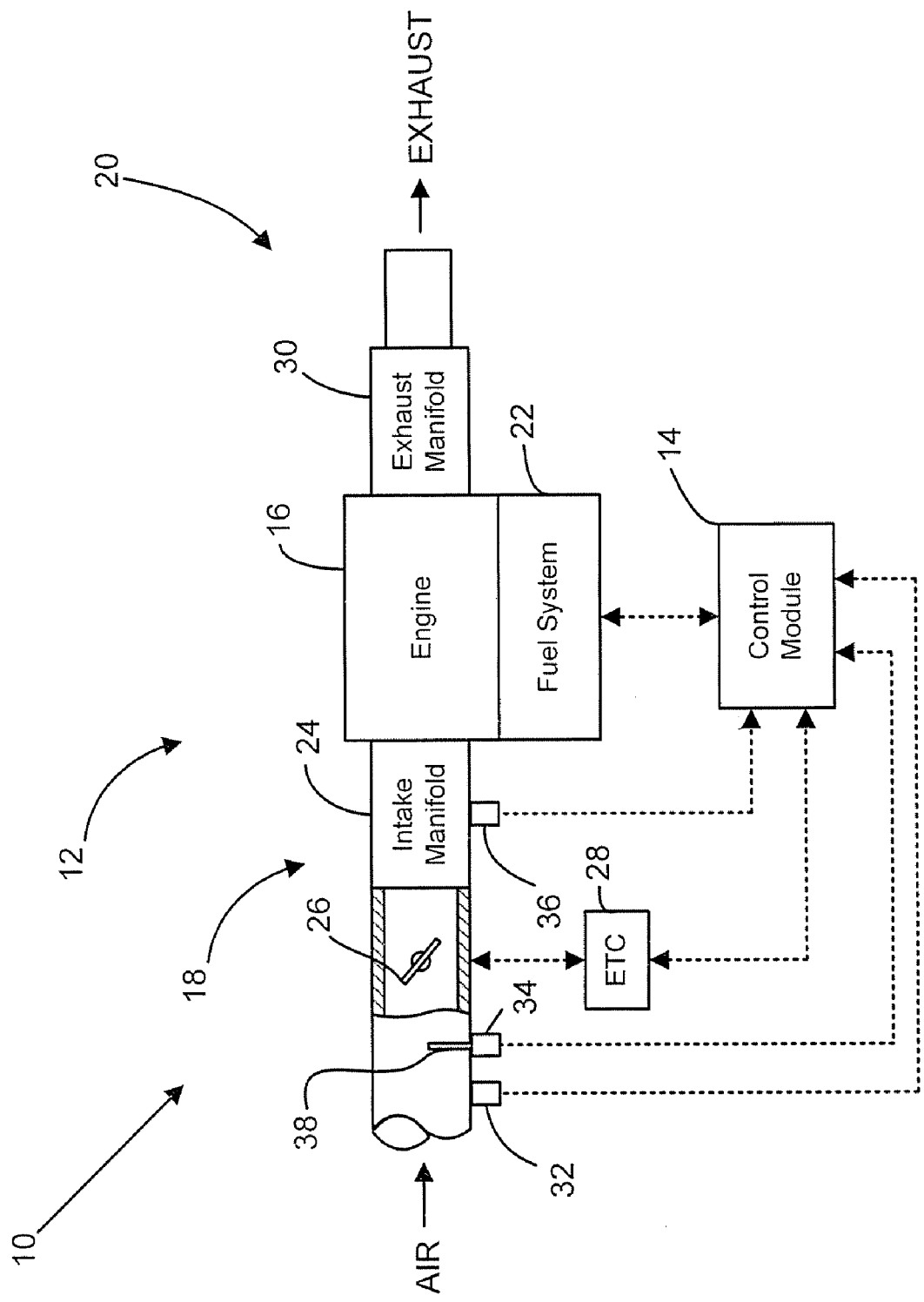
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, a vehicle 10 may include an engine assembly 12 and a control module 14. Engine assembly 12 may include an engine 16, an intake system 18, an exhaust system 20, and a fuel system 22. Intake system 18 may be in communication with engine 16 and may include an intake manifold 24, a throttle 26, and an electronic throttle control (ETC) 28. ETC 28 may actuate throttle 26 to control an air flow into engine 16. Exhaust system 20 may be in communication with engine 16 and may include an exhaust manifold 30. Fuel system 22 may provide fuel to engine 16. Exhaust gas created by combustion of the air/fuel mixture may exit engine 16 through exhaust system 20.

Control module 14 may be in communication with fuel system 22, ETC 28, an intake air temperature (IAT) sensor 32, a mass air flow (MAF) sensor 34, and a manifold absolute pressure (MAP) sensor 36. IAT sensor 32 may provide a signal to control module 14 indicative of an intake air temperature, MAF sensor 34 may provide a signal to control module 14 indicative of a mass air flow into engine 16, and MAP sensor 36 may provide a signal to control module 14 indicative of a manifold absolute pressure. The signal provided by MAF sensor 34 may additionally be used to determine an intake air temperature.

MAF sensor 34 may be a hot wire balanced bridge air flow sensor commonly used for MAF sensor applications. MAF sensor 34 may include a wheatstone thermocouple bridge 38 positioned in the intake air flow path provided to intake manifold 24 and may include a first side having a heated sensing element and calibration resistors and a second side having an air temperature sensitive resistor and calibration resistors.

The heated element may be in the form of a wire or a film. A voltage may be applied to the heated element to maintain a predetermined temperature and balance the bridge 38. As air flow across the heated element increases, the electric power required to maintain the predetermined temperature increases. As air flow across the bridge decreases, the electric power required to maintain the predetermined temperature decreases. The voltage across bridge 38, therefore, provides an indication of the mass flow rate of air across bridge 38. The temperature sensitive resistor may compensate the air flow determination based on an ambient air temperature.

The bridge output voltage may be converted to a pulse modulated signal which may be sent to control module 14. The frequency of the pulse modulated signal may be interpreted by control module 14 as an air flow value. The frequency may additionally be used to determine an air temperature.

More specifically, when engine 16 is in a non-operating condition, there may be generally zero flow into engine 16 through intake manifold 24. As such, there is generally no flow across MAF sensor 34, and therefore bridge 38. During this no-flow condition, the heat from the heated element is dissipated into the air surrounding the heated element in intake system 18. In this no-flow condition, bridge 38 outputs a low voltage and is balanced mainly based on the temperature of the surrounding air in intake system 18.

During this no-flow condition, a generally linear relationship may exist between the frequency provided by the bridge output voltage and the temperature of the surrounding air in intake system 18. More specifically, the frequency provided by the bridge output voltage may be inversely proportional to the air temperature in intake system 18. It is understood that MAF sensor 34 may alternatively provide a frequency that is directly proportional to the air temperature in intake system 18.

Figure 2:
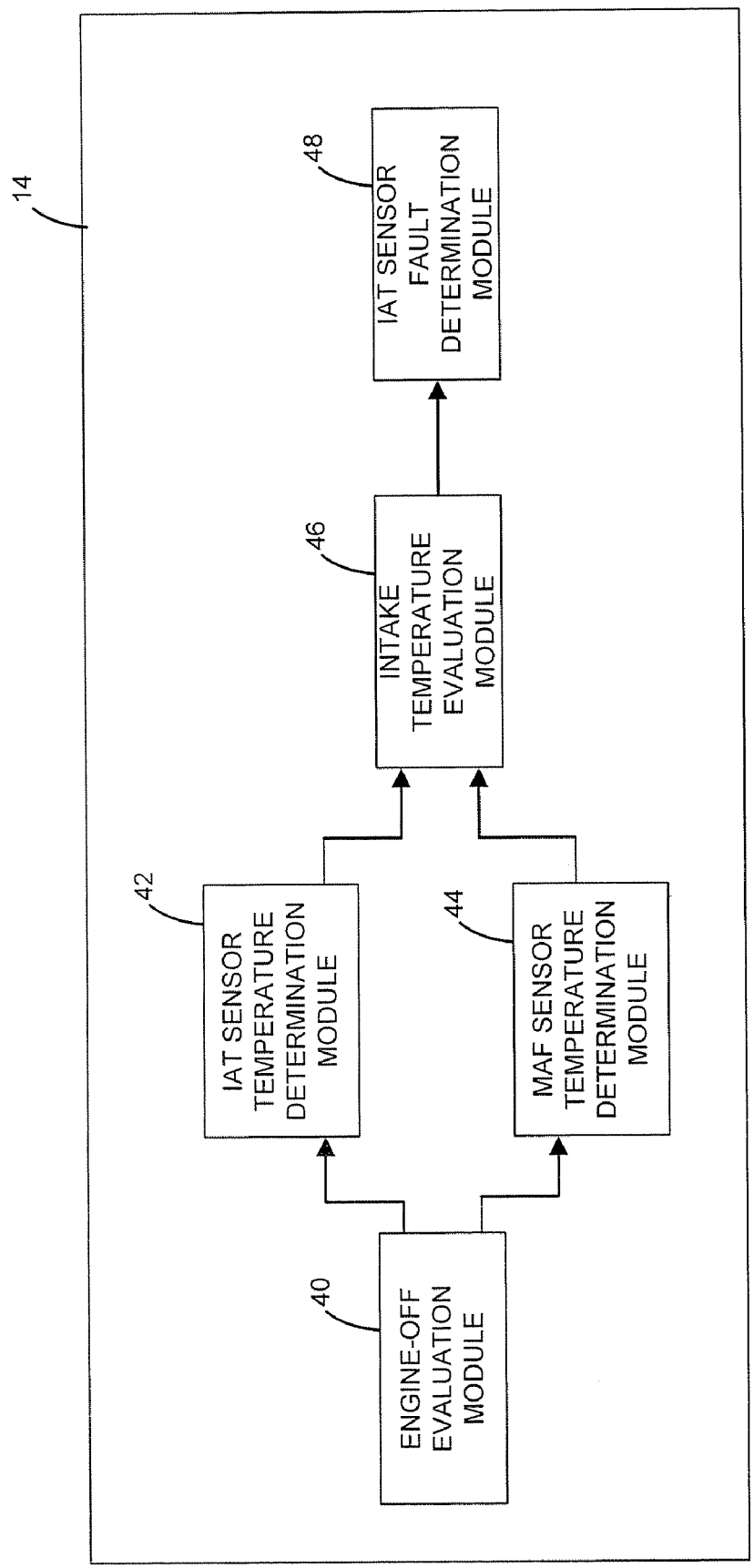
FIG. 2 is a control block diagram of the control module shown in FIG. 1.

Referring to FIG. 2, control module 14 may include an engine-off evaluation module 40, an IAT sensor temperature determination module 42, a MAF sensor temperature determination module 44, an intake temperature evaluation module 46, and an IAT sensor fault determination module 48. Engine-off evaluation module 40 may determine when engine 16 is in a non-operating state and may determine an elapsed time of the non-operating state. Engine-off evaluation module 40 may be in communication with IAT sensor temperature determination module 42 and MAF sensor temperature determination module 44 and may provide the elapsed time of the non-operating state of engine 16 thereto.

IAT sensor temperature determination module 42 may determine the temperature ($T_{IAT}$) of air in intake system 18 provided by IAT sensor 32. IAT sensor temperature determination module 42 may be in communication with intake temperature evaluation module 46 and may provide $T_{IAT}$ thereto. MAF sensor temperature determination module 44 may determine the temperature ($T_{MAF}$) of air in intake system 18 based on the frequency of the signal provided by MAF sensor 34. MAF sensor temperature determination module 44 may include a look-up table and/or a function to convert the frequency to a temperature. MAF sensor temperature determination module 44 may be in communication with intake temperature evaluation module 46 and may provide $T_{MAF}$ thereto.

Intake temperature evaluation module 46 may determine a temperature difference ($\Delta T$) between $T_{IAT}$ and $T_{MAF}$ ($\Delta T_{IAT}-T_{MAF}|$). Intake temperature evaluation module 46 may be in communication with IAT sensor fault determination module 48 and may provide $\Delta T$ thereto. IAT sensor fault determination module 48 may determine whether $\Delta T$ exceeds a predetermined limit and may indicate an IAT sensor fault when $\Delta T$ exceeds the predetermined limit.

Figure 3:
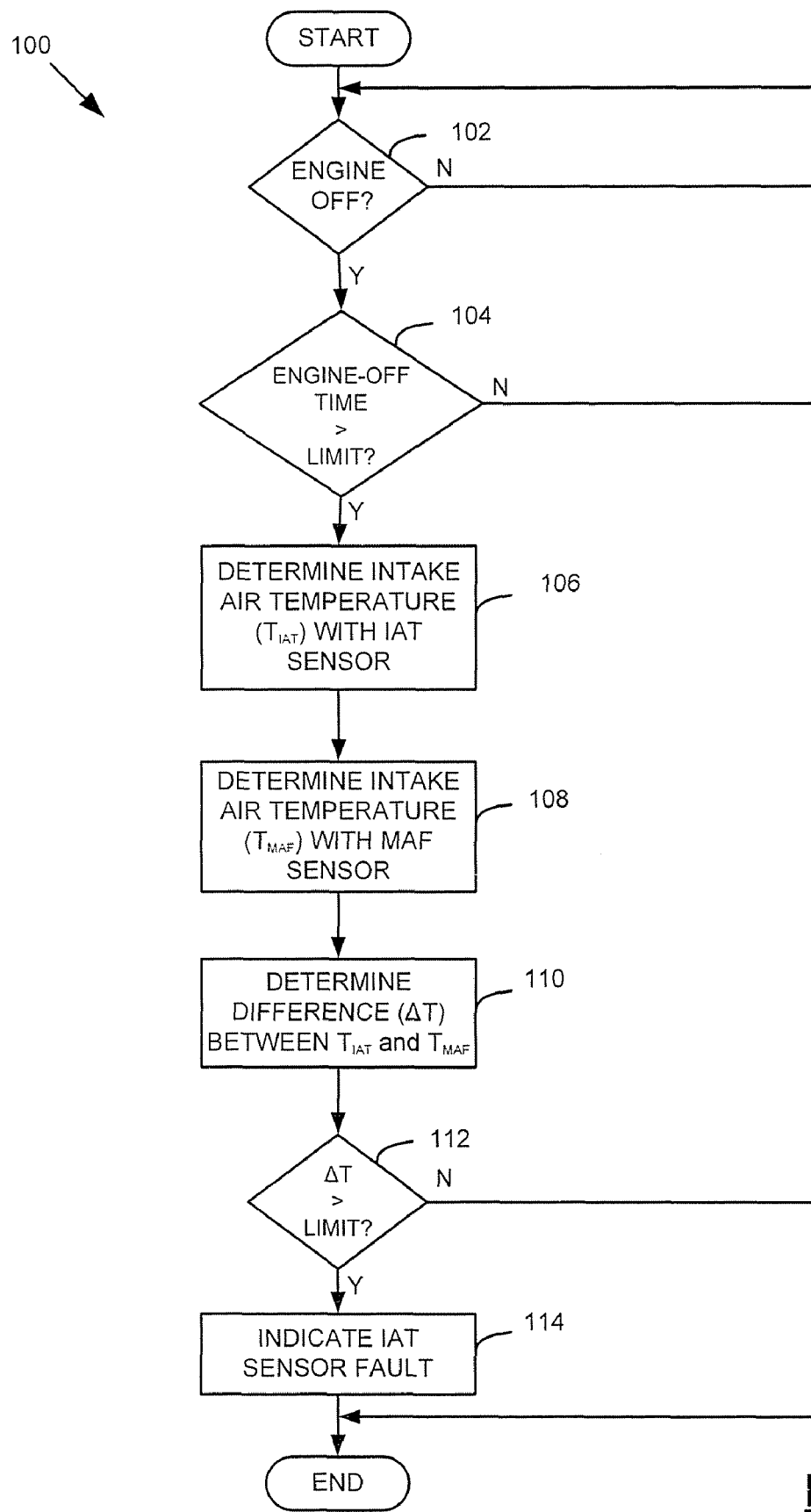
FIG. 3 is a flow diagram illustrating steps for control of the vehicle of FIG. 1.

With reference to FIG. 3, control logic 100 generally illustrates operation of an IAT sensor diagnostic system. Control logic 100 may begin at block 102 where an engine operating state may be evaluated by engine-off evaluation module 40. If engine 16 is in an operating state, control logic 100 may return to block 102. If engine 16 is in a non-operating state, control logic 100 may proceed to block 104.

Block 104 may include evaluation of an elapsed time that engine 16 has been in the non-operating state by engine-off evaluation module 40. If engine 16 has been in the non-operating state for a time less than or equal to a predetermined time limit, control logic 100 may return to block 102. If engine 16 has been in the non-operating state for a time period greater than the predetermined time limit, control logic 100 may proceed to block 106. The predetermined time limit may generally correspond to a time after engine shutdown sufficient to provide a steady state condition within intake system 18. For example, the predetermined time limit may include a time period of greater than 15 minutes after engine shutdown.

Block 106 may determine $T_{IAT}$ with IAT sensor temperature determination module 42. Control logic 100 may then proceed to block 108 where $T_{MAF}$ is determined using MAF sensor temperature determination module 44. Control logic 100 may then proceed to block 110 where difference ($\Delta T$) between $T_{IAT}$ and $T_{MAF}$ is determined by intake temperature evaluation module 46. Control logic 100 may then proceed to block 112 where $\Delta T$ is evaluated by IAT sensor fault determination module 48.

Block 112 may compare $\Delta T$ to a predetermined temperature limit. If $\Delta T$ is less than or equal to the predetermined temperature limit, control logic 100 may terminate. If $\Delta T$ is greater than the predetermined temperature limit, control logic 100 may proceed to block 114 where an IAT sensor fault condition may be indicated. Control logic 100 may then terminate.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method comprising:
   measuring a first intake air temperature (IAT) associated with an engine using an IAT sensor when said engine is in a non-operating condition;
   determining a second intake air temperature associated with said engine using a hot wire air flow meter when said engine is in said non-operating condition, said hot wire air flow meter producing a pulse modulated signal during said non-operating condition;
   determining a frequency of said signal and using said frequency to determine said second intake air temperature; and
   indicating an IAT sensor fault when a difference between said first and second intake air temperatures exceeds a predetermined temperature limit.

2. The method of claim 1, wherein said hot wire air flow meter includes a mass air flow (MAF) sensor located in an intake system of said engine.

3. The method of claim 1, wherein said frequency is linearly related to said second intake air temperature.

4. The method of claim 3, wherein said frequency is indirectly proportional to said second intake air temperature.

5. The method of claim 1, wherein said determining said second intake air temperature includes referencing a look-up table including said second intake air temperature as a function of said frequency.

6. The method of claim 1, further comprising waiting a predetermined time period after operation of said engine before said measuring and said determining.

7. A method comprising:
   determining a mass air flow (MAF) rate into an engine during operation thereof using a hot wire air flow meter;
   measuring a first intake air temperature using an intake air temperature (IAT) sensor when said engine is in a non-operating condition;
   determining a second intake air temperature using said hot wire air flow meter when said engine is in said non-operating condition, said hot wire air flow meter producing a pulse modulated signal during said non-operating condition;
   determining a frequency of said signal and using said frequency to determine said second intake air temperature; and
   indicating an IAT sensor fault when a difference between said first and second intake air temperatures exceeds a predetermined temperature limit.

8. The method of claim 7, wherein said hot wire air flow meter includes a MAF sensor located in an intake system of said engine.

9. The method of claim 7, wherein said frequency is linearly related to said second intake air temperature.

10. The method of claim 9, wherein said frequency is indirectly proportional to said second intake air temperature.

11. A control module comprising:
    an intake air temperature (IAT) sensor temperature determination module that determines a first intake air temperature measurement associated with an engine using an IAT sensor when said engine is in a non-operating condition;
    a mass air flow (MAF) sensor temperature determination module that determines a second intake air temperature associated with said engine using a hot wire air flow sensor when said engine is in a non-operating condition, said MAF sensor temperature determination module receiving a pulse width modulated signal from said hot wire air flow sensor, determining a frequency of said signal and determining said second intake air temperature based thereon;
    an intake temperature evaluation module in communication with said IAT sensor temperature determination module and said MAF sensor temperature determination module that determines a difference between said first and second intake air temperatures; and
    an IAT sensor fault determination module in communication with said intake temperature evaluation module that indicates an IAT sensor fault when said difference exceeds a predetermined temperature limit.

12. The control module of claim 11, wherein said hot wire air flow sensor is located in an intake system of said engine and determines an air flow into said engine when said engine is in an operating condition.

13. The control module of claim 11, wherein said frequency is linearly related to said second intake air temperature.

14. The control module of claim 11, wherein said MAF sensor temperature determination module includes a look-up table including said second intake air temperature as a function of said frequency.

* * * * *